006
United States Patent [19]

Stahlberger et al.

[11] 4,001,442
[45] Jan. 4, 1977

[54] COLLAGEN-CONTAINING PREPARATIONS

[75] Inventors: Bruno Stahlberger, Buchs, Switzerland; Werner von Dach, Balzers, Liechtenstein

[73] Assignee: Elastin-Werk Aktiengesellschaft, Triesen, Liechtenstein

[22] Filed: July 17, 1974

[21] Appl. No.: 489,097

[30] Foreign Application Priority Data

July 18, 1973 Germany .......................... 2336561

[52] U.S. Cl. .............................. 426/105; 106/147; 260/6; 260/15; 426/138; 426/140
[51] Int. Cl.[2] .................. A22C 13/00; C08L 89/06
[58] Field of Search ................ 260/6, 15; 106/147, 106/136, 128, 130, 134; 426/105, 140, 138, 278

[56] References Cited

UNITED STATES PATENTS

| 2,075,276 | 3/1937 | Ellis ......................................... 260/6 |
| 3,123,483 | 3/1964 | McKnight .......................... 426/140 |
| 3,523,027 | 8/1970 | Hall ..................................... 426/140 |
| 3,533,817 | 10/1970 | Shank ................................. 106/147 |
| 3,695,902 | 10/1972 | Shank ............................ 106/147 X |
| 3,806,350 | 4/1974 | Kuhn et al. ........................ 106/124 |
| 3,809,772 | 5/1974 | Jones et al. ......................... 426/105 |

FOREIGN PATENTS OR APPLICATIONS

| 630,150 | 10/1949 | United Kingdom .................... 260/6 |
| 597,404 | 1/1948 | United Kingdom .................... 260/6 |

OTHER PUBLICATIONS

Chem. Absts. 76(1972)101, 236f, "Cylindrically - - Collagen", Battista.
Chem. Absts. 68(1968) 28624j, "Hardened - - - Sausage Casings - - - Boiling", Rosmus et al.
Chem. Absts., 78:41861k, "Protein Fibril Products", Mizuguchi et al.
Chem. Absts., 67:101046h, "Felts Based on Collagen", Battista.

*Primary Examiner*—Edward M. Woodberry
*Attorney, Agent, or Firm*—Brumbaugh, Graves, Donohue & Raymond

[57] ABSTRACT

A preparation is disclosed herein which may be used for making shaped articles, particularly for making tubular films for the packaging of sausages. The preparation comprises collagen and a precondensate, which precondensate comprises a. one or more structural units derivable from a compound containing at least one amine group, and b. one or more structural units derivable from a compound containing at least one aldehyde group and/or one or more structural units derivable from a polyhydroxy compound.

Also disclosed are a process for making the preparation, a method of making a shaped article from the preparation, and shaped articles so made. The collagen used is advantageously contained in an animal hide fibre composition.

45 Claims, No Drawings

COLLAGEN-CONTAINING PREPARATIONS

The invention relates to preparations suitable for the manufacture of shaped articles, especially tubular films for the packaging of sausages to a process for the manufacture of such preparations, the shaped articles manufactured using these compositions, and a method for the manufacture of these shaped articles.

Numerous processes have been proposed for converting collagen, preferably from cattle hide, by chemical, mechanical and/or enzymatic processes into pastes or into aqueous dispersions which can be shaped by casting, wet spinning or dry spinning into shaped articles such as filaments, films or seamless tubular films, for example sausage casings. In these shaped articles, the collagen fibres, which are of very diverse lengths, are present in very diverse reltive orientations, determined by the nature of the shaping process. Thus they may, for example, be predominantly parallel to one another or may run in cross-directions giving a structure similar to that in plywood, but they may alterntively be in a completely random state. Bonding between the fibres, even in the water-swollen form, is in the first instance brought about by natural methods, through iner-fibrillar bonds based on hydrogen bridges. In addition, chemical bonds can be formed artifically between the fibres by means of tanning agents. Thus, when tanning with formadlehyde, the fibres are linked via methylene bridges.

It is only as a result of these chemical bonds produced by tanning agents that shaped articles of collagen acquire their requisite mechanical strength for practical applications. Without the use of inorganic or organic tanning agents or hardeners such as, for example, metal salts or aldehydes, shaped articles made of collagen would swell excessively in water and might even dissolve. It is only as a result of the production of chemical bonds between the fibres, by means of a tanning or hardening treatment, that the films or sheets produced are brought to a state where they only swell in water to the extent that their application demands.

Shaped articles made of collagen-containing preparations and above all continuous tubular films, are outstandingly suitable for use as a sausage casing material. Such tubular films may be manufactured by wet extrusion or dry extrusion of appropriate collagen-containing preparations with solids contents of between 2 and 15%. Tubular films wherein the collagen is obtained from hide fibres is preferred for certain purposes in spite of its limited mechanical strength compared to artificial tubular film, especially of fibrous cellulose material, a fact which is attributable to some hitherto unsurpassed properties of the former material, inter alia good properties when being smoked, with a markedly advantageous development of flavour of the sausage, natural appearance, particular suitability, above all, for air-dried Italian and Hungarian uncooked types of sausages, and hitherto unique usability as an edible skin for sausages which are to be eaten hot.

Because, however, of the constantly rising costs of raw hides, which are the starting material for the above-mentioned preferred collagen-containing preparation, it would be desirable to extend the collagen composition with a cheap additive. If this is done, however, the favourable properties of collagens must be preserved. Moreover, the tubular film made from hide fibres has hitherto been hardened or tanned in a separate treatment stage wherein, as a rule, the tube is sprayed with a solution of the tanning agent (for example formaldehyde). It would also be desirable to avoid this additional tanning treatment without at the same time relinquishing the improvement in properties resulting from chemical crosslinking.

The present invention provides a preparation which comprises collagen and a precondensate (as hereinafter defined), which precondensate comprises (a) one or more structural units derivable from a compound containing at least one amine group, and (b) one or more structural units derivable from a compound containing at least one aldehyde group and/or one or more structural units derivable from a polyhydroxy compound. By a precondensate is meant a product which is not fully cured but which under appropriate reaction conditions can be cured (or hardened) to give a fully cured three-dimensional network.

Condensation products of compounds containing amino groups, for examples urea or casein and aldehydes for example formaldehyde are sometimes known as amino plasts. The term "aminoplast" is generally used to include both fully cured products and low molecular weight precursors of such products, but where this term is used in this specification it is, of course, used to denote the low molecular weight products or precondensates. In the past aminoplasts have, because they tend to be, or to become, brittle rarely been used for the manufacture of films, and it is surprising that such compounds can be mixed with collagens, within a broad range of mixing ratios, to give preparations which have those properties of hide fibre preparations which make the hide fibre preparations suitable for the manufacture of sausage casings.

The invention thus makes it possible to replace a large part of the collagen previously used in the manufacture of sausage casings by aminoplasts. Since the aminoplast base materials are substantially cheaper than collagen, a considerable saving is achieved even when the collagen and aminoplast are combined in the ratio of 1:1.

A further advantage of the invention is that it is possible, by using a precondensate which is such that it can effect both the hardening of the precondensate itself and a hardening of the collagen and, if desired, a crosslinking of aminoplast with the collagen, to omit an additional hardening or tanning treatment.

Further advantages which may be obtained by using a mixture of collagen and aminoplast according to the invention, are the good drying properties of the tubular films manufactured therefrom, which permit higher production speeds than with pure hide fibre tubular films. Furthermore it is possible to make deliberate changes and improvements in the suitability of the sausage casing for boiling sausage or raw sausage, by varying the composition of the aminoplast. Thus, for example, the peelability of the casings produced from collagen-aminoplast mixtures is excellent when these casings are used for boiling sausages and raw sausages.

It has been found that in the mixtures of collagen and aminoplast the collagen fibre are homogeneously embedded in the aminoplast, that is to say the aminoplast almost completely surrounds the collagen fibres. It is surprising that in spite of this the collagen properties are preserved even when a major proportion of aminoplast is used. It would have been expected that in cases in which the collagen fibres are embedded in a foreign substance or encased therein, the properties of the foreign substance would dominate. Thus it is known that when mechanically resistant skeleton materials, such as cotton fibres, cellulose fibres or plastics fibres, are incorporated into a collagen mass these skeleton constituents are in most cases completely surrounded by the collagen and are virtually present as islands in the collagen. In these cases, in which the collagen always surround the foreign fibres, the collagen properties are, as might be expected, preserved. The addition of such foreign fibres, in major proportions and with effective lengths, is however, difficult to achieve and gives, as well as the advantages of greater mechanical strength, an increase in the cost of process.

The collagen used in accordance with the invention is advantageously contained in an animal hide fibres composition, which composition may have a solids content of approximately 2 to 15%, preferably 6 to 15%.

The precondensates used according to the invention can be manufactured from the starting materials in the presence of acid or alkaline catalysts.

Examples of suitable compounds containing amino groups which may be used in the manufacture of precondensates are urea, casein, gelatine, soya casein, albumins, keratin, ethylenediamine and mixtures of these compounds. Examples of suitable aldehydes are formaldehyde, glyoxal, glutaraldehyde, furfuraldehyde, glycerolaldehyde, crotonaldehyde and starchdialdehyde. In addition to these constituents, plasticisers can also be incorporated into the precondensate in order to counteract tendencies to brittleness. Polyhydroxy compounds, for example glycerol, sorbitol, polyoxymethylene or hydroxycellulose, are suitable for use as plasticisers. When polyhydroxy compounds are used, the precondensate of the compound containing amino groups and the aldehyde is etherified, producing etherified aminoplasts. Combinations of such etherified aminoplasts with collagen give very soft products. The term "poly" in this context means "at least two".

The ratios of the amounts of individual components in the precondensate can vary within relatively wide ranges. For each mol of compound containing amino groups (expressed as urea), 0.1 to 3.0 mols of aldehyde may, for example, be present, and advantageously 0.5 to 3 mols, and preferably 0.8 to 1.5 mole, of aldehyde are used per mol of compound containing amino groups. The polyhydroxy compounds are advantageously present in amounts of 0 to 2 mols per mol of amino compound.

In a preferred embodiment of the invention, in which a subsequent hardening or tanning of shaped articles manufactured from the preparation according to the invention is dispensed with, the amount of aldehyde in the precondensate must be so chosen that on ultimate hardening of the precondensation, when drying the film, the amount of aldehyde liberated in substantially equal to the amount which is necessary for hardening the collagen, with a possible excess of aldehyde being able to effect crosslinking between the precondensation and the colagen.

If the precondensates are manufactured in the presence of an alkaline catalyst the products obtained from, for example, formaldehyde and urea are methylolureas (monomethylolamines and dimethylolamines), whilst with acid catalyst the same starting materials give methyleneureas or methyleneamines. These intermediate compounds, of which the precondensate which is mixed with the collagen consists, crosslink on drying, after shaping the mixture of collagen and precondensate, to form three-dimensionally crosslinked condensation products. Additional aldehyde liberated in the crosslinking process can serve for additional crosslinking of the collagen.

Mineral acids, for example hydrochloric acid, sulphuric acid, phosphoric acid or sulphurous acid, can be used as acid cataylsts for the manufacture of the precondensates. Alterntively, acid salts, for example potassium bisulphite or ammonium sulphate or organic acids, for example formic acid, acetic acid, lactic acid or citric acid, may be used.

Alkaline catalysts which may be used include ammonia, sodium hydroxide solution, potassium hydroxide solution, hexamine, hydroxylamine, hydrazine, and basic salts, for example sodium bicarbonate or ammonium carbonate. Of course, mixtures of these compounds are also suitable for use as catalysts.

Alkaline catalysts give slow condensation reactions whilst acid catalysts give condensation reactions which take place vigorously and are therefore somewhat more difficult to control.

When manufacturing the precondensate, care must be taken to ensure that homogeneous temperature conditions exist throughout the entire reaction mixture since only then are resins with a uniform degree of condensation, which subsequently give resin-collagen products with a very low proportion of water-soluble matter, obtained. The precondensation is controlled by continuous measurement of the gelling time of the resin. A constantly uniform degree of condensation can most easily be achieved in a continuous flow process through a thermostatically controlled pipe system.

The properties of the precondensates depend on the nature of the starting materials, on the condensation time and on the condensation temperature. The precondensate can be characterized by its viscosity or its gelling time.

For the purposes of the invention, particularly preferred precondensates are those of which the gelling times, after addition of 10 percent by weight of an 18% strength hydrochloric acid, are between 9 and 50 minutes, measured at 25° C. The preferred reaction temperatures are 25° to 90° C and the preferred reaction times 40 to 400 minutes. Mixing of the precondensation with the collagen can be effected by any suitable method. The mixing time is not critical. It varies depending on the type of mixer and is preferably about 1 to 2 hours.

For homogeneous mixing of the collagen and the precondensate it is necessary to select conditions under which the spontaneous final condensation, that is to say the complete hardening of the precondensate to three-dimensional condensation products, is prevented. A resin which has been precondensed under alkaline conditions, and which is brought to the same pH as the collagen, for example to 3.0, cannot be mixed homogeneously into the collagen without at least partial hardening occurring.

On the other hand, collagen-containing compositions undergoes shrinkage at a pH value greater than about 3.3. Surprisingly, however, precondensates which have been prepared under alkaline conditions can be mixed with a collagen-containing composition, for example an animal hide fibre composition, without causing shrinkage of the collagen, if the precondensate is adjusted to a pH of about 8 to 11 by means of alkali before being mixed with the collagen composition. During this mixing, the mixture assumes a pH value of, for example, 3.45 and remains a normally swollen extrudable fibre composition.

It appears to be essential that the mixture of the collagen and precondensate should settle down to a buffered acid ph range which only leads to an acid final condensation, that is to say to a crosslinking, when the acid concentration increases as a result of drying the shaped article. This difference in concentration of the acid can be further adjusted as desired by adding acid to the mixture, without changing the buffer pH. The readiness of the precondensate to undergo final condensation on addition of different amounts of acid can be measured on a gelation meter.

Tests have shown that the addition of 10% of an 18% strength hydrochloric acid to the precondensate should normally give a gelling time of less than about 50 minutes measured on the gelation meter (TECAM Gelation Timer) if the final condensation is to occur on drying a tube manufactured from a preparation containing the precondensate. Furthermore, the addition of 10% of a 3.6% strength hydrochloric acid to the precondensate should advantageously give a gelling time of more than 1,000 minutes if it is intended that the preparation should, prior to shaping show substantially no signs of further condensation.

The nature of the starting materials used in preparing the precondensate, the selected degree of condensation and the conditions under which the precondensate is mixed with the collagen determine whether the final condensate forms a coherent phase in the end product, for example in the sausage casing, or whether it consists of mutually isolated resin islands. If a coherent phase of the condensate in the mixture with collagen is obtained, the mechanical strength of the aminoplast or of its crosslinking product with collagen is the determining factor in the mechanical strength of the product.

One or more additional substances, for example fibres (for example fibres of cellulose, polyamides or polyesters) dyestuffs, plasticisers (for example glycerol, sorbitol or carboxymethylcellulose) latexes and fungicides can be included in the preparation of the invention. The amounts of these additives depends on the nature of the additive. Fibres may be used in amounts of up to 25%, preferably up to 15%, plasticisers in smaller amounts, up to about 10%, and dyestuffs in amounts of up to about 4%.

Mixtures of different precondensates can of course be used in the preparation of the invention in order to modify the properties of the end product.

Instead of reacting the compound containing amino groups with an aldehyde, this compound can be reacted with a polyhydroxy compound, for example a polyhydric alcohol, after which the aldehyde required for the crosslinking may be added separately to the precondensate and/or to the collagen composition. Comparatively soft products, showing only a slight tendency to become brittle, may be obtained by using certain amounts of, for example, casein in the precondensate, or by using longer-chain aldehydes or dialdehydes, for example glutaraldehyde, for hardening. Sufficiently soft products can be obtained even without plasticisers, through the selection of suitable precondensates.

Amongst aminoplasts, products of high impermeability to water vapour are known. The proportion of precondensates in the preparation of the invention determines the impermeability to water vapour of the shaped articles, for example films, produced. The fibre structure remains preserved even at high proportions of aminoplast, of up to 90%, in the collagenaminoplast mixture. For practical purposes of sausage casing manufacture, however, not more than 70, and preferably not more than 50, % by weight of the collagen are replaced by aminoplast.

Using equal amounts of, for example, a urea-formaldehyde precondensate and a dry collagen-containing composition, the temperature for 10% shrinkage is found to be from 55° to 57° C, that is to say similar to that for a correspondingly hardened pure collagen product. The amount of shrinkage is also approximately the same, but the shrinkage force is substantially less and in a particular case was about half that of a correspondingly hardened collagen. The boil resistance, that is to say the resistance to degradation in boiling water, depends on the degree of hardening of the combination of materials.

During the final condensation of a precondensate which has been prepared under acid conditions, water and aldehyde are eliminated. The starting materials and the precondensation reaction can be so chosen that the aldehyde eliminated in the final stage suffices for crosslinking the collagen constituent. Excess amounts of aldehyde can be bound by amounts of a binding agent, for example urea or casein, mixed with the collagen. In such cases, the reaction with urea competes with the reaction with the collagen and the reaction with the precondensate but, because of the lower affinity of urea for, for example, formaldehyde, it is only capable of binding the residual formaldehyde after the hardening of the collagen or resin has terminated.

The hardening time depends on the nature of the precondensate, on its proportion in the total preparaton and, of course, on the drying temperature. The hardening time can vary within wide limits, namely between a few hours and several weeks.

Hardened urea-formaldehyde resins and their combination with casein and/or collagen are physiologically harmless when used as containers for foodstuffs, for example, as sausage casings which are neither intended, nor suitable, for consumption. The starting materials formaldehyde, urea and casein are inexpensive products manufactured on a large industrial scale. Their use in accordance with the process of the invention is uncomplicated, it being possible to manufacture the precondensates continuously and in an automatic process. The preparations of the invention can be extruded to give sausage casings and dried on installations for the conventional manufacture of hide fibre tubular film without changes to the installation. Furthermore, textile fibres can, without problems, be incorporated in the preparation of the invention so that films correspondingly reinforced with extraneous fibres can also be produced.

The preparation of the invention can be foamed in any suitable manner and can be used, in this form, for numerous purposes for which foamed collagen is also employed, for example as a wound dressing, for adhesive plasters, or as a cushion underlay.

The preparations of collagen and precondensate may be shaped in any suitable manner, for example by wet spinning or dry spinning and are preferably shaped to give tubular films which are sutable for use as sausage casings. After shaping, the tube is dried. In the preferred embodiment of the invention, in which the preparation contains an amount of aldehyde which suffices for hardening (this amount being, as a rule, built into the precondensate), the precondensate hardens, on drying, with elimination of aldehyde, and the collagen is hardened at the same time. Crosslinking bridges between the aminoplast and the collagen can also be formed in this way. The drying treatment can be followed by further treatments which are in themselves known, with, for example, hardeners or plasticisers. The finished tube may be subjected to a conditioning treatment, after which it may be optionally concertina-folded or wound up on rollers for transport purposes.

The following Examples illustrate the invention:

EXAMPLE 1

50 g of urea are dissolved in 60 g of 38% strength formaldehyde (molar ratio 1:0.75) with the addition of 30 ml of water and 5 ml of 25% strength ammonia, and the solution is heated for 3 hours in a boiling water bath, whilst stirring. In the course thereof, the solution becomes progressively more viscous, and turbid. The pH value of this precondensate settles to a figure of 8.45.

50 g of this precondensate and 500 g of collagen-containing hide fibre composition having a solids content of 11% and a pH value of 3.0 are brought together in a Zeta mixer and kneaded for half an hour, whilst cooling. 1 ml of 18% strength hydrochloric acid is then mixed in, with further kneading. The resulting composition has a solids content of 21% and a pH value of 3.45.

This composition can be shaped into continuous sausage casings on conventional installations for the manufacture of hide fibre gut by the dry spinning process, and can be dried continuously.

After drying, the tubular material is passed through a spray of wood smoke condensate, containing 0.13% of formaldehyde. After further drying, the tubular gut is pressed flat and wound up into a roll. The diameter of the tubular gut is 47 mm and its wall thickness is $3.9 \times 10^{-2}$ mm.

After ripening for 9 days, the sausage casing has a pH value of 5.15. The water absorption on steeping is 180% and the wet bursting pressure 0.85 atmosphere gauge. After 10 days, the tubular casing is provided with 9% of its weight of glycerol, in a spray installation, in order to make the casing soft and elastic. The casing proves to be suitable for the manufacture of raw sausages and boiling sausages. Its modulus of elasticity in the wet state is 8.6 kp/mm$^2$. In water at 75° C, it shrinks in area by 50%, the linear shrinkage force being 700 g/mm$^2$. It can be closed on the customary clip apparatuses.

EXAMPLE 2

70 g of urea are dissolved in 130 g of 38% strength formaldehyde (molar ratio 1:1.5) with addition of 200 ml of water and 5 ml of 25% strength ammonia, and the mixture is stirred for 130 minutes at 60° C. The temperature is then raised to 80° C and stirring is continued until the viscosity, measured with a Ford cup of 2 mm orifice at 20° C, is 100 seconds. The total reaction time is then about 250 minutes. The gelling time, measured by means of the TECAM Gelation Timer is 44 minutes at 20° C after addition of 10% of 3.6% strength hydrochloric acid.

During the reaction, the pH value for the precondensate decreases from 9.5 to 6.0. To delay the condensation, the pH is brought back to 9 with N sodium hydroxide solution.

The precondensate is mixed with hide fibre composition in accordance with Example 1. The mixture assumes a pH value of 3.45. Its solids content is 21%.

The gut casing which has been dried after extrusion, and wound up, has a width of 47 mm and a wall thickness of $4.1 \times 10^{-2}$ mm. Further hardening, for example by spraying with wood smoke condensate, is not necessary.

After three weeks, the water absorption after steeping is 120% and the pH value is 3.0. The modulus of elasticity is 8.6 kp/mm$^2$. The casing is suitable for the manufacture of boiling sausages and raw sausages and can be clipped on the customary devices.

The wet tensile strength is 4.2 kp/mm$^2$ in the longitudinal direction and 3.7 kp/mm$^2$ in the transverse direction and the wet bursting pressure is approx. 1 atmosphere gauge. In water at 75° C, the casing shrinks in area by 34%, with the linear shrinkage force being 950 g/mm$^2$.

EXAMPLE 3

100 g of casein, 1,500 g of glycerol (82% strength), 100 g of ammonia (25% strength) and 100 g of water are mixed well, whilst stirring, and the mixture is then stirred at room temperature for 6 hours. After adding 30 ml of 38% strength formaldehyde, the whole is stirred for a further hour. The viscosity, measured with a Ford cup of 2 mm orifice at 20° C, is 500 seconds, and the pH value is 10. The gelling time, measured with the TECAM Gelation Timer at 20° C, is 1,000 seconds after addition of 10% of 3.6% strength hydrochloric acid. The precondensate is soluble in water in all proportions.

35 g of this precondensate are added to 500 g of hide fibre composition of 11% solids content and pH value of 3.0. Thus, the amount of precondensate present is 39% of the weight of precondensate plus hide fibre composition. After mixing for half an hour in a Zeta kneader whilst cooling, 5 ml of 3.6% strength hydrochloric acid are mixed in, and kneading is then continued for half a hour. The pH of the composition assumes a value of 4.0. The solids content of the composition is 17%. The composition has the typical properties of a hide fibre composition which can be shaped by the dry spinning process, to give a tubular gut.

Films of this composition, of average thickness 0.5 mm, are spread on a Teflon-coated pair of rollers having a circumferential speed ratio of 40:27.

After 3 weeks, the pH value of the films is 3.45 and the water absorption on steeping is 244%, becoming 140% after 6 weeks.

The pH value rises to 5.0. The modulus of elasticity of the wet film, measured after the sixth week, is 7.8 kg/mm$^2$.

EXAMPLE 4

100 g of casein, 1,500 g of 82% strength glycerol, 100 g of water and 100 g of 25% strength ammonia are mixed and the mixture is stirred for 6 hours at room temperature. 50 ml of 25% strength glutaraldehyde are then mixed in, after which stirring is continued for 1 hour at room temperature.

The viscosity, measured with a Ford cup of 2 mm orifice at 20° C, is 500 seconds, the pH value is 10 and the gelling time after additon of 10% of 3.6% strength hydrochloric acid is 1,000 minutes at 20° C.

The precondensate is mixed into the hide fibre composition as in Example 3, and films are again manufactured from this composition. The water absorption after 3 weeks is 180%, the modulus of elasticity of the wet film is 7.9 kg/mm$^2$ and the wet tensile strength is 6.2 kp/mm$^2$.

The mixture of 500 kg of hide fibre composition of 11% solids content and 50 kg of the precondensate gives a composition which can be processed on conventional installations for the manufacture of hide fibre gut, to give a continuous sausage casing.

EXAMPLE 5

100 g of casein, 1,200 g of glycerol (82% strength), 100 g of water and 100 g of ammonia (25% strength) are mixed and the mixture is stirred for 6 hours at room temperature. 30 ml of 40% strength glyoxal are then mixed in after which stirring is continued for 1 hour at room temperature. The viscosity, measured with a Ford cup of 2 mm orifice at room temperature, is 800 seconds, the pH value is 10 and the gelling time at room temperature, after addition of 10% of 3.6% strength hydrochloric acid, is 500 minutes.

The precondensate is mixed with hide fibre composition as in Example 3, and the resulting composition is spread to produce films. The water absorption of these films after 3 weeks is 148%, the modulus of elasticity of the wet film is 8.7 kp/mm$^2$ and the wet tensile strength is 6.0 kp/mm$^2$. The mixture of 500 g of hide fibre composition and 50 g of precondensate gives a composition which can again be converted to continuous sausage casings on conventional installations for the manufacture of hide fibre gut.

EXAMPLE 6

50 g of urea, 80 g of 38% strength formaldehyde (molar ratio 1:1), 5 ml of ammonia, (25% strength) and 100 g of 82% strength glycerol are mixed and the mixture is precondensed for 130 minutes at 60° C. The pH value decreases from 9 to 6 and is adjusted to 12 with N sodium hydroxide solution.

Etherification is carried out at the boil in a vacuum of 14 mm Hg, until the elimination of water has ceased. This requires about 5 hours at a heating bath temperature of about 100° C. The resulting condensate is water-clear, soluble in water in all proportions, and highly viscous. Its pH value is 9, and the gelling time at 20° C is 6 minutes after addition of 10% of 18% strength hydrochloric acid and 1,200 minutes after addition of 10% of 3.6% strength hydrochloric acid. 15 g of 38% strength formaldehyde are now additionally mixed into the precondensate, after which it has a solids content of about 98%.

50 g of this precondensate are mixed with 500 g of hide fibre composition of 11% solids content in a Zeta kneader and 5 ml of hydrochloric acid (3.6% strength) are added. The pH assumes a value of 3.45.

Films are prepared from this composition, of 19.2% solids content, in accordance with Example 3. Their water absorption after 3 weeks is 175%, the pH value is 4.6, the modulus of elasticity of the wet film is 10 kp/mm$^2$ and the wet tensile strength is 6.2 kp/mm$^2$.

The composition has the typical properties of a hide fibre composition and can be converted to endless gut casings on conventional installations for the manufacture of hide fibre gut by the dry spinning process.

EXAMPLE 7

175 g of urea, 325 g of 38% strength formaldehyde (molar ratio 1:1.5), 25 ml of 25% strength ammonia and 150 g of 82% strength glycerol are mixed and further processed in accordance with Example 6.

The gelling time of the precondensate at 20° C is 6 minutes after addition of 10% of hydrochloric acid (18% strength) and 3,000 minutes after addition of 10% of hydrochloric acid (3.6% strength). The remaining properties correspond to the precondensate in Example 6.

7 kg of the precondensate, of about 98% solids content, are mixed with 60 kg of hide fibre composition of 11% solids content in a Zeta kneader, without addition of further acid. After kneading for 1 hour, the composition is suitable for extrusion on conventional installations for the manufacture of hide fibre gut. The pH of the composition is 4.0 and the solids content 21%. A gut of 47 mm width and 4.8 × 10$^{-2}$ mm wall thickness is produced. After 3 weeks, the properties found are a water absorption capacity of 120%, a pH value 3.0, a modulus of elasticity of the wet gut of 11 kp/mm$^2$, a wet tensile strength of 5.6 kp/mm$^2$ and a wet bursting pressure of more than 1 atmosphere gauge.

In water at 75° C, the casing shrinks in area by 36%, with a linear shrinkage force of 1,320 g/mm$^2$. The casing produced is suitable for boiling sausages and can be handled successfully on customary clip apparatuses.

EXAMPLE 8

700 g of precondensate according to Example 3 and 7 kg of precondensate according to Example 7 are mixed and kneaded into 60 kg of hide fibre composition of 11% solids content. The mixture assumes a pH value of 4.5 and a solids content of 26.2%.

This composition is extruded on a conventional installation for the manufacture of hide fibre gut, and is dried. The sausage casing, of 43 mm width and 4.5 × 10$^{-2}$ mm wall thickness, after 3 weeks shows a water absorption capacity of 115%, a pH value of 2.55, a modulus of elasticity of the wet casing of 6.1 kp/mm$^2$, a wet tensile strength of 3.2 kp/mm$^2$ and a wet bursting pressure of 0.85 atmosphere gauge. In water at 75° C, the casing shrinks in area by 45%, with a linear shrinkage force of 930 g/mm$^2$.

The sausage casing is provided with about 9% of glycerol in a spray process, and after about 24 hours these casings are concertina-folded on a customary device.

The substances which can be eluted with water account for 14% of the gut weight and consist of 10% of glycerol, 0.2% of hydrochloric acid and 3.8% of neutral salts. 150 ppm of free formaldehyde are found.

The sausage casing is suitable for the manufacture of boiling sausages and can be handled successfully on customary clip apparatuses.

EXAMPLE 9

300 g of casein, 30 g of sodium hydroxide, 100 g of water and 1,200 g of 82% strength glycerol are mixed and the mixture is stirred for 6 hours at room temperature. This produces a highly viscous solution of pH value above 12.

This mixture is brought together with 7 kg of precondensate according to Example 7.

70 ml of 38% strength formaldehyde are then added and the whole is kneaded into 60 kg of hide fibre composition of 11% solids content and pH value of 3.0. The pH value of the resulting composition is adjusted to 3.45 with hydrochloric acid (3.6% strength), the solids content of the composition being 27.8%.

This composition is extruded on a conventional installation for the manufacture of hide fibre gut, and is dried. The sausage casing, of 50 mm width, has a wall thickness of $4.4 \times 10^{-2}$ mm and after 10 days shows a water absorption capacity of 170%, a pH value of 2.55, a modulus of elasticity of the wet casing of 6.2 kp/mm², a wet tensile strength of 4.8 kp/mm² and a wet bursting pressure of 0.95 atmosphere gauge. In water at 75° C, the casing shrinks in area by 43%, with a linear shrinkage force of 1,120 g/mm².

EXAMPLE 10

100 g of latex are added to the mixture of the precondensate in Example 9. In other respects, the procedure of Example 9 is followed.

Films of this combination, manufactured as in Example 3, have very good elastic properties and a soft handle. After 10 days, a water absorption capacity of 200%, a pH value of 2.8, a modulus of elasticity of the steeped film of 4.2 kp/mm² and a wet tensile strength of 8.2 kp/mm² are found.

In water at 75° C, the film shows a shrinkage capacity, in area, of 50%.

EXAMPLE 11

A mixture of 70 g of urea, 130 g of 38% strength formaldehyde, 5 ml of 25% strength ammonia, 200 g of sorbitol (Karion F, MERCK) and 15 g of cellulose fibres of 10 denier and 5 mm average length is precondensed for 130 minutes at 60° C and is then, following the addition of 15 ml of N potassium hydroxide, etherified for approx. 10 hours at the boil in a vacuum of 14 mm Hg, until the release of water has ceased. The pH value of this precondensate is 9.5, the solids content is about 98% and the gelling time is 8 minutes after addition of 10% of hydrochloric acid (18% strength) and 1,600 minutes after addition of 105 of 3.6% strength hydrochloric acid.

65 g of this precondensate are kneaded into 500 g of hide fibre composition of 11% solids content and pH value 3.0. Furthermore, 5 ml of hydrochloric acid (3.6% strength) are mixed in. After kneading for 1 hour, the pH has assumed a value of 3.45 (solids content 23%).

Films of this composition show similar properties to those from Example 3 but have a higher tear propagation resistance.

EXAMPLE 12

A mixture of 1,200 g of urea and 750 ml of 40% strength formaldehyde is stirred for 90 minutes at room temperature. In the course thereof, the pH value rises from 6.0 to 6.4. 4 ml of concentrated lactic acid are now stirred in, after which the pH value drops to 4.2. The temperature rises to 36° C over the course of 10 minutes. After cooling in an ice bath, condensation is continued for 15 minutes. The mixture is then neutralised with 1 N sodium hydroxide solution. The viscosity of this mobile precondensate is about 100 seconds (2 mm Ford cup, 20° C). The gelation time after addition of 10% of 3.6% strength HCl is about 1,000 minutes at 20° C.

70 g of this precondensate are kneaded with 500 g of hide fibre composition of 11% solids content and pH value 3.0 in a Zeta mixer, during which the pH assumes a value of 3.5

Films are manufactured from this composition in accordance with Example 3 and largely correspond, in their properties, to those from Example 3. They exhibit a soft handle without using additional plasticiser.

EXAMPLE 13

130 ml of 25% strength ammonia are added to a mixture of 1,200 g of urea, 750 g of 40% strength formaldehyde and 200 ml of water and the mixture is condensed for 60 minutes at 60° C. 40 ml of concentrated lactic acid are then added and the condensation is continued for 60 minutes at pH 4. The viscosity assumes a value of 455 seconds (2 mm Ford cup, 20° C). After addition of 10% of 18% strength hydrochloric acid, the measured gelling time is 300 minutes.

After completion of the condensation, the mixture is neutralised to pH 5.8 with 1 N sodium hydroxide solution.

70 g of this precondensate are kneaded with 500 g of hide fibre composition of 11% solids content and pH value 3.0 in a Zeta mixer, in the course of which the pH assumes a value of 3.5.

Films are manufactured from this composition in accordance with Example 3 and largely correspond, in their properties, to those from Example 3, but exhibit a soft handle without using additional plasticiser.

We claim:

1. A preparation which comprises collagen and a precondensate, which precondensate comprises
   a. one or more structural units derivable from a compound containing at least one amino group, and
   b. one or more structural units derivable from a compound containing at least one aldehyde group, or one or more structural units derivable from a polyhydroxy compound which precondensate is also reacted with a compound containing an aldehyde group, said preparation containing at least 39% but at most 90% by weight of precondensate, based on the weight of collagen plus precondensate.

2. A preparation as claimed in claim 1, wherein the collagen is contained in an animal hide fibre composition.

3. A preparation as claimed in claim 2, wherein the animal hide fibre composition has collagen content of 2 to 15%.

4. A preparation as claimed in claim 3, wherein the collagen content is 6 to 15%.

5. A preparation as claimed in claim 1, which contains at most 70% by weight of precondensate, based on the weight of collagen plus precondensate.

6. A preparation as claimed in claim 1, which contains at most 50% by weight of precondensate, based on the weight of collagen plus precondensate.

7. A preparation as claimed in claim 1, wherein the ratio of collagen to precondensate is substantially 1: 1.

8. A preparation as claimed in claim 1, wherein the precondensate comprises amine structural units and aldehyde structural units in a molar ratio of from 1 : 0.1 to 1 : 3.0.

9. A preparation as claimed in claim 8, wherein the molar ratio is from 1 : 0.5 to 1 : 3.

10. A preparation as claimed in claim 8, wherein the molar ratio is from 1 : 0.8 to 1 : 1.5.

11. A preparation as claimed in claim 1, wherein the precondensate comprises amine structural units and polyhydroxy compound structural units in a molar ratio of from 1 : up to 2.

12. A preparation as claimed in claim 1, wherein the proportion of aldehyde structural units is such that, when the precondensate is hardened, no additional aldehyde is required for crosslinking the collagen.

13. A preparation as claimed in claim 12, wherein the proportion is such that crosslinking between the precondensate and the collagen can also be effected without addition of further aldehyde.

14. A preparation as claimed in claim 12, which also comprises a substance for binding excess aldehyde.

15. A preparation as claimed in claim 14, wherein the binder comprises urea and/or casein.

16. A preparation as claimed in claim 1, wherein the precondensate has, after addition of 10% by weight of 18% strength hydrochloric acid, a gelling time at 20° C of 9 to 50 minutes.

17. A preparation as claimed in claim 1, wherein the precondensate has, after addition of 10% by weight of 3.6% hydrochloric acid, a gelling time at 20° C of more than 1,000 minutes.

18. A preparation as claimed in claim 1, wherein the amine structural units comprise units derivable from one or more compounds selected from urea, casein, gelatin, soya casein, albumins, keratins and ethylene diamine.

19. A preparation as claimed in claim 1, wherein the aldehyde structural units comprise units derivable from one or more compounds selected from formaldehyde, glyoxal, glutaraldehyde, furfuraldehyde, glycerolaldehyde, crotonaldehyde and starch-dialdehyde.

20. A preparation as claimed in claim 1, wherein the polyhydroxy compound structural units comprise units derivable from one or more compounds selected from glycerol, sorbitol, polyoxymethylenes and hydroxy cellulose.

21. A preparation as claimed in claim 1, which comprises a precondensate produced by maintaining the starting materials at a temperature of from 25 to 90° C for a time of 40 to 400 minutes.

22. A preparation as claimed in claim 1, which comprises a precondensate prepared in the presence of a basic catalyst.

23. A preparation as claimed in claim 22, wherein the basic catalyst comprises one or more compounds selected from ammonia, sodium hydroxide solution, potassium hydroxide solution, hexamine, hydroxylamine, hydrazine, and basic salts.

24. A preparation as claimed in claim 23, wherein the basic salt is sodium bicarbonate or ammonium carbonate.

25. A preparation as claimed in claim 1, which comprises a precondensate prepared in the presence of an acid catalyst.

26. A preparation as claimed in claim 25, wherein the acid catalyst comprises one or more compounds selected from mineral acids, acid salts and organic acids.

27. A preparation as claimed in claim 26, wherein the mineral acid(s) is or are selected from hydrochloric acid, sulphuric acid, phosphoric acid and sulphurous acid, the acid salt(s) is or are selected from potassium bisulphite or ammonium sulphate, and the organic acid(s) is or are selected from formic acid acetic acid, lactic acid and citric acid.

28. A preparation as claimed in claim 1, which comprises two or more different precondensates.

29. A preparation which comprises collagen and at least 39% of a precondensate of casein, formaldehyde and, optionally, glycerol based on the weight of collagen plus precondensate.

30. A moulding preparation for the manufacture of films, especially tubular films for packaging sausages, which preparation comprises
 a. animal hide fibre composition, and
 b. at least 39% of an aminoplast precondensate of one or more compounds containing free amino groups with one or more aldehydes and, optionally, one or more polyhydroxy compounds based on the weight of the fiber composition plus precondensate.

31. A preparation as claimed in claim 1, which also comprises one or more additional substances selected from fibres, dyestuffs, plasticizers, latex and fungicides.

32. A preparation as claimed in claim 31, wherein fibres of cellulose, a polyamide or a polyester are used.

33. A preparation as claimed in claim 31, wherein the plasticizer(s) is or are selected from glycerol, sorbitol and carboxymethycellulose.

34. A process for the manufacture of a preparation suitable for making a shaped article, which comprises mixing collagen with at least 39% of a precondensate based on the weight of a collagen plus precondensate, which precondensate comprises
 a. one or more structural units derivable from a compound containing at least one amine group, and
 b. one or more structural units derivable from a compound containing at least one aldehyde group and-/or one or more structural units derivable from a polyhydroxy compound.

35. A process as claimed in claim 34, wherein the collagen and precondensate are mixed for a time of about 1 to 2 hours.

36. A process as claimed in claim 34, wherein the pH of a precondensate which has been prepared under alkaline conditions is adjusted, before the precondensate is mixed with the collagen, to a value of about 8 to 11.

37. A method of manufacturing a shaped article which comprises shaping a preparation which comprises collagen and a precondensate, which precondensate comprises
 a. one or more structural units derivable from a compound containing at least one amine group, and
 b. one or more structural units derivable from a compound containing at least one aldehyde group, or one or more structural units derivable from a polyhydroxy compound which precondensate is also reacted with a compound containing an aldehyde group, said preparation containing at least 39% but at most 90% by weight of precondensate, based on the weight of collagen plus precondensate to the desired shape and drying, and if necessary heating the preparation to cause the collagen to crosslink and the precondensate to crosslink.

38. A method as claimed in claim 37, wherein the shaped article is treated, before or after drying, with one or more substances selected from plasticizers, hardening agents and neutralizing agents.

39. A method as claimed in claim 37, wherein the shaped article is a tubular film.

40. A shaped article whenever produced by a method as claimed in claim 37.

41. A sausage wherein the casing is a shaped article as claimed in claim 40.

42. A sausage wherein the casing is derived from a preparation which comprises collagen and a precondensate, which precondensate comprises
 a. one or more structural units derivable from a compound containing at least one amine group, and b. one or more structural units derivable from a compound containing at least one aldehyde group, or one or more structural units derivable from a polyhydroxy compound which precondensate is also reacted with a compound containing an aldehyde group, said preparation containing at least 39% but at most 90% by weight of precondensate, based on the weight of collagen plus precondensate.

43. A preparation which comprises collagen and a precondensate, which precondensate comprises
  a. one or more structural units derivable from a compound containing at least one amino group, and or one or more structural units derivable from a polyhydroxy compound which precondensate is also reacted with a compound containing an aldehyde group, said preparation containing from about 50% to at most 90% by weight of precondensate, based on the weight of collagen plus precondensate.

44. A method of manufacturing a shaped article which comprises shaping a preparation which comprises collagen and a precondensate, which precondensate comprises
  a. one or more structural units derivable from a compound containing at least one amine group, and
  b. one or more structural units derivable from a compound containing at least one aldehyde group, or one or more structural units derivable from a polyhydroxy compound which precondensate is also reacted with a compound containing an aldehyde group, said preparation containing from about 50% to at most 90% by weight of precondensate, based on the weight of collagen plus precondensate to the desired shape and drying, and if necessary heating the preparation to cause the collagen to crosslink and the precondensate to crosslink.

45. A sausage wherein the casing is derived from a preparation which comprises collagen and a precondensate, which precondensate comprises
  a. one or more structural units derivable from a compound containing at least one amine group, and
  b. one or more structural units derivable from a compound containing at least one aldehyde group, or one or more structural units derivable from a polyhydroxy compound which precondensate is also reacted with a compound containing an aldehyde group, said preparation containing from about 50% to at most 90% by weight of precondensate, based on the weight of the collagen plus precondensate.

* * * * *